No. 640,006. Patented Dec. 26, 1899.
C. & H. LINDENBERGER & W. B. TEAL.
STORAGE BATTERY.
(Application filed Oct. 7, 1898. Renewed Aug. 21, 1899.)
(No Model.)
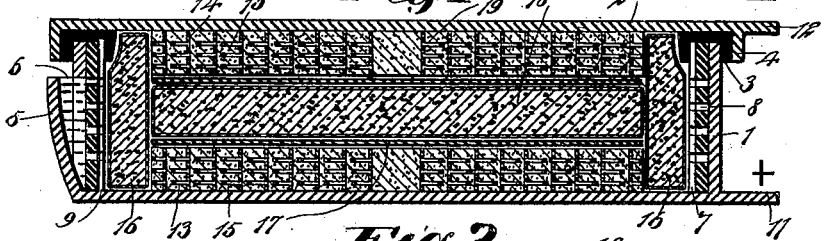
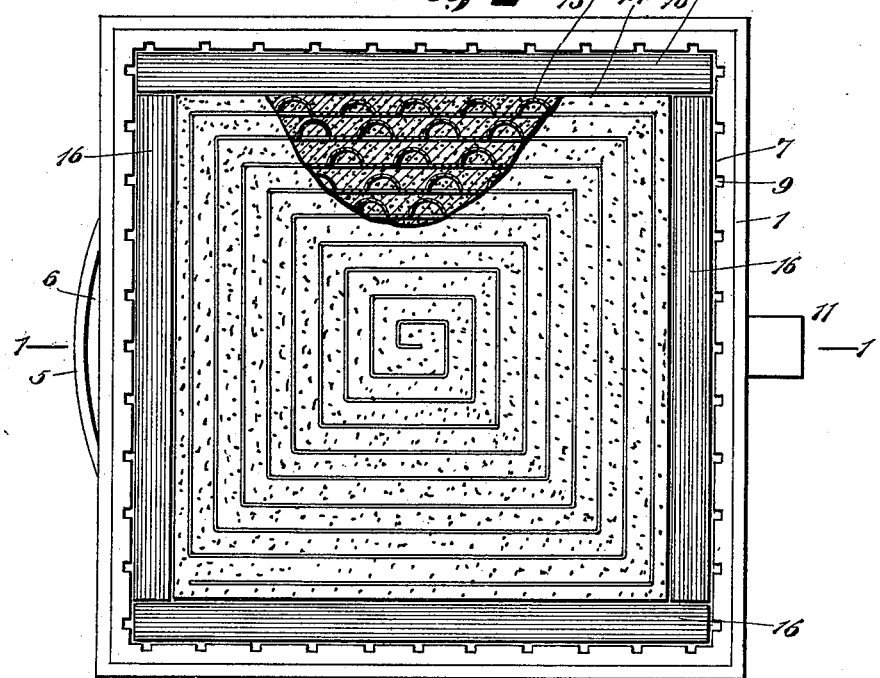
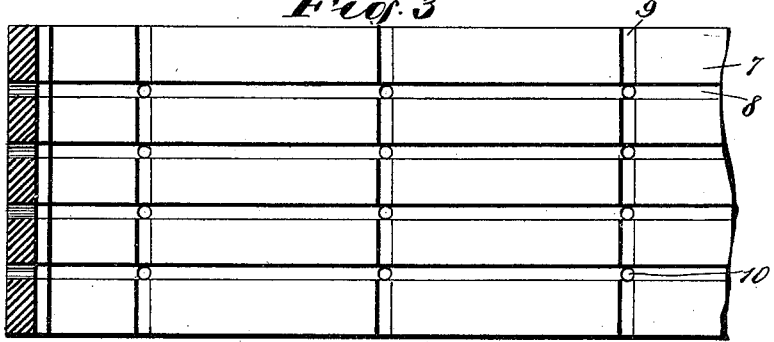
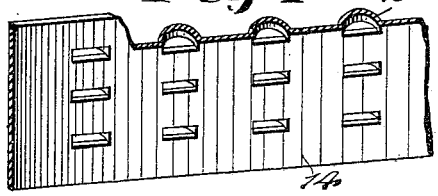
WITNESSES:
INVENTORS
Charles Lindenberger
Harry Lindenberger
BY Wm B. Teal
ATTORNEYS.

UNITED STATES PATENT OFFICE.

CHARLES LINDENBERGER, HARRY LINDENBERGER, AND WILLIAM B. TEAL, OF HANNIBAL, MISSOURI, ASSIGNORS TO THEMSELVES AND WILBERT H. COBB, OF SAME PLACE.

STORAGE BATTERY.

SPECIFICATION forming part of Letters Patent No. 640,006, dated December 26, 1899.

Application filed October 7, 1898. Renewed August 21, 1899. Serial No. 727,973. (No model.)

*To all whom it may concern:*

Be it known that we, CHARLES LINDENBERGER, HARRY LINDENBERGER, and WILLIAM B. TEAL, of Hannibal, in the county of Marion and State of Missouri, have invented a new and Improved Storage Battery, of which the following is a full, clear, and exact description.

This invention relates to improvements in electric storage batteries; and the object is to provide a storage battery of light yet strong construction and having the elements so arranged as to afford a maximum surface area within a minimum space.

We will describe a storage battery embodying our invention, and then point out the novel features in the appended claims.

Reference is to be had to the accompanying drawings, forming a part of this specification, in which similar characters of reference indicate corresponding parts in all the views.

Figure 1 is a sectional elevation on the line 1 1 of Fig. 2 of a storage battery embodying our invention. Fig. 2 is a plan view, partly broken away and with the upper portion of the casing removed. Fig. 3 is an inside view of an insulating-lining employed; and Fig. 4 is a perspective view, partly broken away, of a portion of an element employed.

The casing of the cell or battery comprises a tray-like lower portion 1 and a cover 2, the cover being insulated from the lower portion by a soft-rubber band 3, bearing on the upper edges of the side walls of the lower portion and also engaging with the under side of the cover and with a downwardly-extended flange 4 on said cover. One of the side walls of the lower portion has a strip 5 bent outward to form an opening 6, through which the electrolyte may be poured in. After placing the electrolyte in the casing the opening 6 may be properly sealed, as will be hereinafter described. The casing may consist of lead, but preferably we will employ aluminium, as aluminium presents sufficient strength, is a superior conductor of electricity, and will diminish the weight of the entire battery or cell.

Arranged around and against the inner surface of the side walls of the tray-like portion is a lining 7 of hard rubber or similar insulating material that will serve to strengthen the battery-casing. This lining is provided with longitudinal channels 8 and vertical channels 9, and at the intersection of the vertical channels with the longitudinal channels openings 10 are provided. These openings 10 and the channels are designed to facilitate the circulation of the electrolyte as required.

The lower portion 1 of the casing has an outwardly-extending lip 11 and the upper portion has an outwardly-extending lip 12. These lips are designed to support binding-posts and to connect the casings together electrically. Each of the battery elements 13 14 is composed of one or more strips or ribbons of sheet-lead, perforated in such manner that projecting loops 15 are formed upon one side and a corresponding opening upon the reverse side. The loops are not cut at either end, but each loop is continuous with the main strip and acts as an electric conductor. When the strips or ribbons are coiled, as indicated in Fig. 2, the loops serve to separate the surfaces of the coils, thereby permitting the space between approximating surfaces to be perfectly filled with active material—such, for instance, as red lead in the positive coil and litharge in the negative coil. The coils are then treated with electrolyte, subjected to pressure, and formed by electric current, all while contained in suitable molds. It is obvious that the elements arranged as those described afford a maximum surface area within a minimum space.

The projecting loops on the lead strips or ribbons serve several essential purposes—viz., to separate the coils equidistantly, thus giving proper space for the active material and to increase the surface area. Each projecting loop makes electric contact with the approximating surface of each coil, thus making the element practically one piece, and by perforating the strips in the manner stated the sectional area of the strip is not reduced. This fact permits the use of a heavier charging-current, while an excessive discharge-rate can be made without causing buckling or other injurious effect, as the coils lie flat and are cemented together by the active material, which is held securely by the loops and openings formed on the strips.

In assembling the parts the positive element 13 is to be placed flat upon the bottom of the lower or tray-like portion of the casing. Upon each of the four sides of the tray, inside, we arrange in upright position around the elements absorption-pads 16, composed of pulverized charcoal, asbestos fiber, and bibulous paper. Immediately upon the upper surface of the positive element we place a sheet of asbestos paper 17, then another absorption-pad 18, formed as above described, and upon this we place a sheet of asbestos 19, which supports the negative element 14. Of course the lower portion of the casing and the negative element will be in electrical contact, as here shown, with the upper portion of the casing. After the parts are so placed the rubber packing or strip 3 is to be placed over the edge of the side portions of the tray-like casing, after which the cover 2 is to be placed in position. Sufficient pressure is then applied to seal the casing, and the whole is to be then immersed in melted paraffin, which serves as an exterior insulation and to perfect the sealing process. This arrangement of parts prevents the possibility of buckling, change of shape, or dropping out of the active material, and also allows the elements to be placed close together, thereby reducing internal resistance to a minimum. The purpose of the pads 16 and 18 is to serve as reservoirs to hold and distribute the electrolyte to the interior of the battery as required.

Having thus described our invention, we claim as new and desire to secure by Letters Patent—

1. In a storage battery, a casing comprising two conducting-sections removable one from the other and insulated one from the other, side walls on one of the sections, a lining of insulating material extended around the inner face of said side walls, asbestos pads placed against said lining, two battery elements one being in electrical connection with one section of the casing and the other in electrical connection with the other section of the casing, and an absorbent pad between the two elements, substantially as specified.

2. In a storage battery, a casing comprising a tray-like lower portion and a cover both of conducting material, an insulating material between the cover and tray-like portion, a lining of insulating material arranged against the inner face of the side walls of the lower portion, the said lining having perforations or channels, absorbent pads placed against said lining, a battery element having connection with the tray-like section of the casing, a battery element having electrical connection with the cover of the casing, and an absorbent material between said elements, substantially as specified.

3. In a storage battery, a casing, battery elements in the casing, absorbent pads surrounding the edges of the elements, and an absorbent pad arranged between the elements, each of said absorbent pads consisting of charcoal, asbestos fiber, and bibulous paper, substantially as specified.

CHARLES LINDENBERGER.
HARRY LINDENBERGER.
WILLIAM B. TEAL.

Witnesses:
FRANK W. HIXSON,
JOHN A. STONE.